Oct. 5, 1965     C. F. DUPUIS     3,209,978
LIQUID ABSORBING AND CONCEALING DEVICE
Original Filed July 3, 1961     2 Sheets-Sheet 1
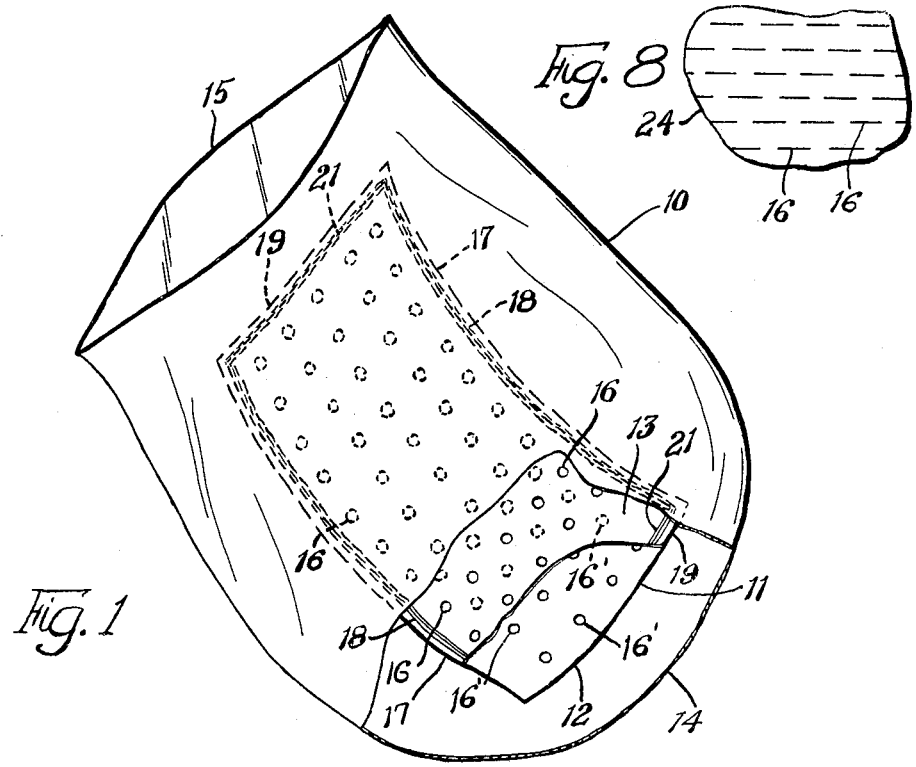
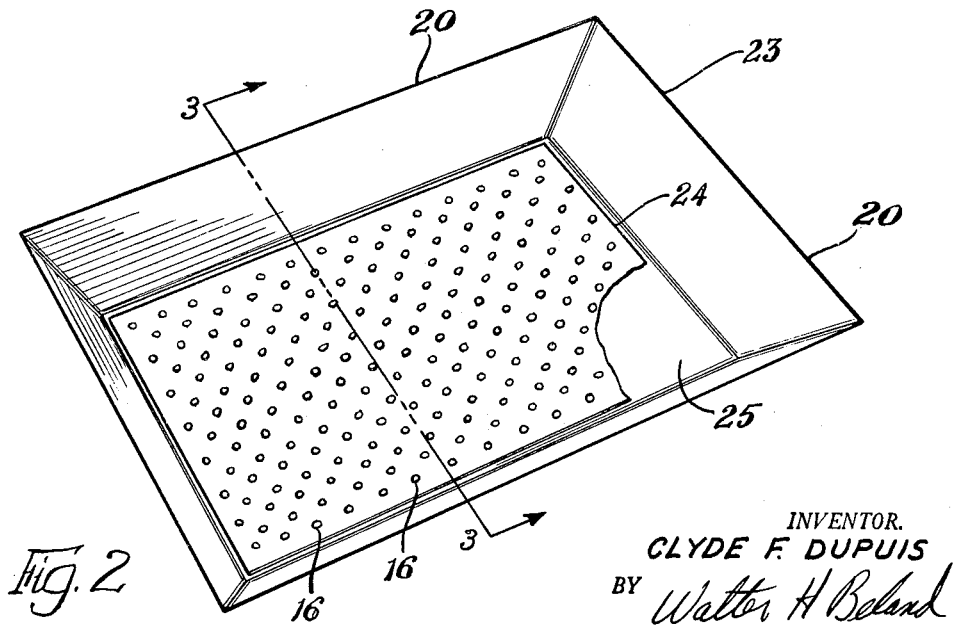
INVENTOR.
CLYDE F. DUPUIS
BY Walter H Beland
AGENT Oct. 5, 1965   C. F. DUPUIS   3,209,978
LIQUID ABSORBING AND CONCEALING DEVICE
Original Filed July 3, 1961   2 Sheets-Sheet 2
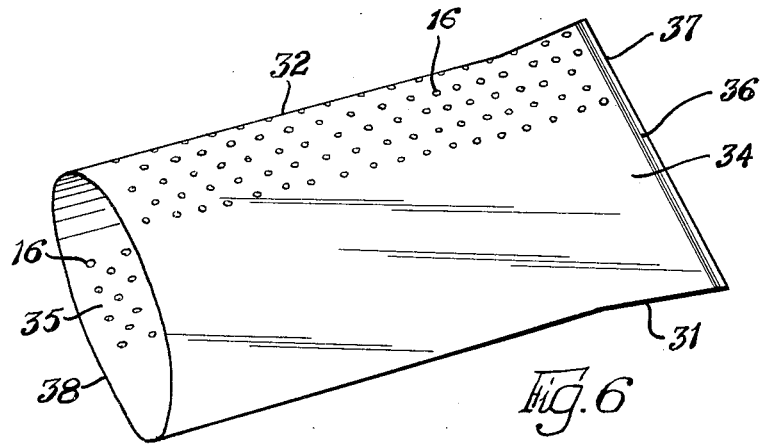
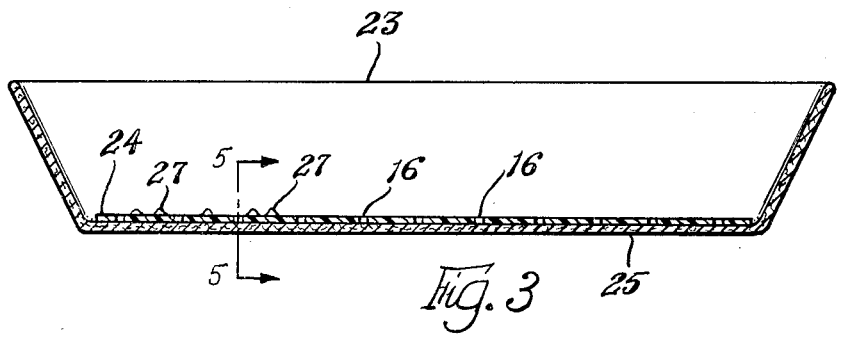
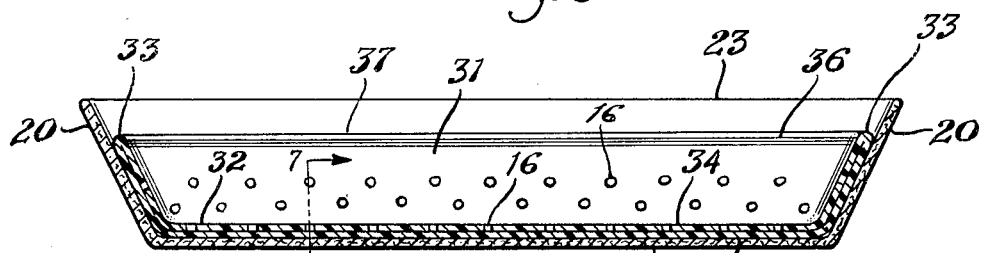
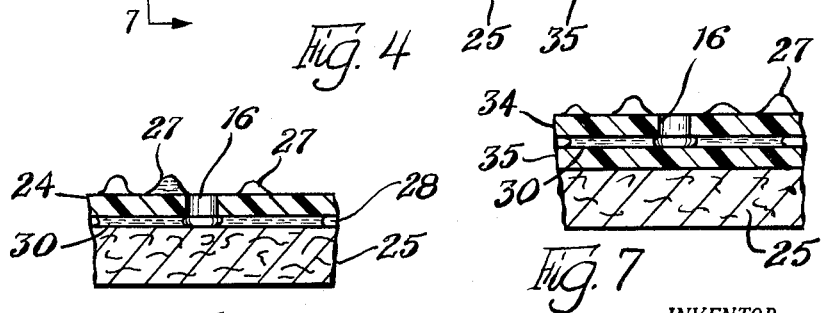
INVENTOR.
CLYDE F. DUPUIS
BY Walter H Beland
AGENT United States Patent Office 3,209,978
Patented Oct. 5, 1965

3,209,978
LIQUID ABSORBING AND CONCEALING DEVICE
Clyde F. Dupuis, Downers Grove, Ill., assignor to Continental Can Company, Inc., New York, N.Y., a corporation of New York
Original application July 3, 1961, Ser. No. 128,176, now Patent No. 3,156,402, dated Nov. 10, 1964. Divided and this application Apr. 8, 1964, Ser. No. 358,343
9 Claims. (Cl. 229—14)

This is a division of patent application Serial No. 128,176, filed July 31, 1961, entitled "Liquid Absorbing and Concealing Device," now Patent Number 3,156,402, issued on November 10, 1964.

This invention relates to packaging, and in particular to the packaging of food products that exude juices, such as meat and poultry.

In the packaging of meat and poultry the trend has been toward placing such food product in plastic bags which are made out of transparent plastic material so that the product can be readily observed by the prospective customer. Another form of packaging having wide spread use in the trade for meat and poultry is comprised of a tray which is generally flat but has upturned marginal edges. The meat or poultry is placed in the tray and a transparent overwrap of plastic material such as cellophane is placed over the open top of the tray to cover the product, and the edges of the film are gathered together on the outside bottom surface of the tray and heat sealed together. Such trays may be made of molded cellulosic pulp, cardboard, metal foil or from a number of suitable plastic materials.

Although these bags and trays are admirably suited to display the product for the prospective customer, it has been found that the meat or poultry exude juices which collect in the lowermost portion of the plastic bags and in the bottom of the trays. These juices are readily visible to the prospective customer and give the package a generally sloppy and undesirable appearance.

The object of the invention is to provide a liquid absorbing and concealing structure that can be placed into a plastic bag so as to rest along the bottom thereof or into the bottom of a tray for the purpose of absorbing and concealing a substantial protion of the juices that will subsequently be exuded by the meat or poultry product placed in the bag or tray.

The invention will be best understood by referring to the drawings in which:

FIGURE 1 is a perspective view, with portions broken away, of a transparent plastic bag having a liquid absorbing structure in accordance with the invention, inserted therein;

FIGURE 2 is a perspective view of a tray with a simplified form of the liquid absorbing structure placed in the bottom thereof;

FIGURE 3 is a transverse section through the tray taken along section line 3—3 of FIGURE 2;

FIGURE 4 is a transverse section through a tray as in FIGURE 3 in which is shown a liquid absorbing structure that extends peripherally upwardly along the upturned marginal edge of the tray;

FIGURE 5 is a fragmentary sectional view to an enlarged scale taken through the bottom of the tray of FIGURE 3 along section line 5—5 thereof;

FIGURE 6 is a perspective view showing how a liquid absorbing structure, in accordance with the invention, can be fabricated from an extruded tube of thermoplastic material;

FIGURE 7 is a partial sectional view to an enlarged scale through the bottom of the tray of FIGURE 4 taken along section line 7—7 thereof; and FIGURE 8 is a fragmentary view of a liquid absorbing surface in which the liquid absorbing openings are in the form of slits.

Referring to FIGURE 1 of the drawings, a plastic bag 10 which may be made of any suitable transparent plastic material is provided for the insertion therein of juice exuding meat or poultry product. Placed in the bag through the mouth 15 and resting on the surface of the bag that will be the lowermost surface when the product containing bag is on display, is a liquid absorbing structure 11. The structure 11 is composed of two superposed sheets of material indicated at 12 and 13. The lowermost sheet 12 rests against the sidewall 14 of bag 10. Sheet 12 has a series of openings 16' which are arranged in a pattern over substantially the entire surface area of the sheet and which pass completely through the sheet. Sheet 13 which is closely superposed over sheet 12, also contains a pattern of openings of like size as the size as the openings 16' in sheet 12, and which cover substantially the entire sheet. These openings are designated as 16. Further, as shown in FIGURE 1, the pattern formed by the holes 16 is staggered with respect to the pattern formed by holes 16', such that the holes 16 and 16' do not coincide. As shown, the holes 16 are spaced equidistantly from the adjacent holes 16'. Since the plastic bag 10 is flexible, the superposed sheets 12 and 13 might be moved out of registration during the filling of the bag with product and subsequent handling by prospective buyers. In order to prevent this from occurring, it is desirable to seal the sheets together around the marginal edges thereof. As shown, opposed marginal edges 17 of the structure 11 are sealed together by means of heat welding or adhesive as at 18 and opposed marginal edges 19 are sealed as at 21. The structure 11 is illustrated in FIGURE 1 as being rectangular in shape, but it should be understood that the sheets 12 and 13 forming the structure 11 can be made circular, elliptical, or in any other desired outline to best suit the shape of the individual bag 10. Sheets 12 and 13 may be fabricated from one of a number of suitable materials such as waxed paper, cellophane, polyethylene, or other thermoplastic or thermosetting plastic materials; the main criteria being that the material should be substantially moisture resistant and opaque. When meat or poultry product is placed in the bag 10 on top of the moisture absorbing structure 11 and the mouth 15 of the bag is suitably tied or sealed closed, droplets of juice will eventually exude from the product and will fall down onto the top sheet 13 on which they will move about whenever the resulting package is shifted. Eventually the great majority of the droplets on the sheet 13 will come into contact with the edge of an opening 16 whereby the droplet is drawn by gravity and capillary action through the opening into the capillary gap formed between sheets 12 and 13. Droplets thus trapped between sheets 12 and 13, which sheets are substantially opaque, are thus effectively concealed from the vision of a prospective customer. Openings 16' in the lowermost sheet 12 are effective in collecting any droplets that might get around and under the liquid absorbing structure 11. In this respect it should be understood that if the liquid absorbing structure 11 is made large enough so that it is a remote possibility that any of the juice will get around and underneath the structure, openings 16' in the lowermost sheet 12 will not be necessary.

Referring to FIGURE 2 of the drawings, it will be seen that a tray of substantially opaque material is provided and is indicated by the numeral 23. A thin sheet of opaque moisture resistant material, such as the sheet 24, is placed on the top interior surface of the bottom panel 25 of the tray. The sheet 24 is provided with a plurality of the openings 16 which pass completely therethrough. The openings 16 are arranged in a pattern which substantially covers the entire surface area of the sheet. FIGURE 3 shows in transverse cross section taken along line 3—3 of FIGURE 2, the relationship of the sheet 24 and the tray 23. Also shown in FIGURE 3 are droplets of juice 27 as would be exuded from meat or poultry product that would be placed in the tray and the tray and product therein then being overwrapped with a sheet of thin transparent material such as cellophane the edges of which would be gathered and heat sealed against the outer bottom surface of the tray. In FIGURE 5 is illustrated at an enlarged scale, a section through the bottom panel 25 of the tray 23 taken along line 5—5 of FIGURE 3 showing the capillary gap 28 existing between the bottom of the sheet 24 and the top surface of the bottom panel 25 of the tray. When the dry sheet 24 is placed on the bottom panel 25 of the tray 23, which is also dry, only a hairline capillary gap 28 exists. However, when the meat or poultry is inserted into the tray, and the transparent overwrap applied and sealed, droplets of juice 27 eventually begin to collect on the upper surface of the sheet 24. The droplets will begin to move about during movement of the tray causing droplets to collide to form larger droplets and causing droplets to come into contact with the edge of the openings 16. Due to the action of gravity and to the capillary attraction of the capillary gap 28 for the juice of the droplets 27; any droplet coming into contact with the edge of an opening 16 will be drawn down through the opening 16 and will be distributed in the capillary gap 28. In areas of the sheet 24 whereat the product is not in contact with the sheet 24 or in only a light contacting relationship, the absorbed fluid 30 will tend to lift or float the sheet 24 such as to increase the height of the capillary gap 28 which allows a greater volume of fluid to be stored. As illustrated, the storing fluid 30 tends to surround the individual openings 16 and is not visible through openings 16. In the structure of FIGURES 2, 3 and 5 the sheet 24 may be fabricated from any one of a number of suitable materials which are substantially opaque and moisture resistant. For instance, the sheet 24 could be fabricated from a heavy gauge waxed paper, or a thin sheet of wax or plastic coated cardboard. Other materials that could be used include thin aluminum foil, and films formed from organic polymeric thermoplastic materials such as polyethylene and polypropylene. Other types of plastic film such as moisture resistant cellophane, may also be effectively employed. Since the upper surface of the bottom panel 25 of the tray 23 is used as the lower wall of the capillary gap 28, it comes into direct contact with the stored fluid 30; therefore, it is preferable that the tray be formed from a moisture resistant plastic material by either the process of vacuum thermo-forming or injection molding. As illustrated in FIGURE 3, fibrous material such as molded cellulosic pulp is used. However, since such material will absorb the juice which will cause the bottom of the tray to become soggy and weak, the material illustrated has a coating (not shown) at least on the interior surface thereof, of a suitable wax or plastic coating material well known to the trade to render the inside of the tray substantially moisture resistant.

In FIGURE 6 is shown how a liquid absorbing structure 31 which may be used in the bag of FIGURE 1 may be fabricated from a length of opaque seamless thermoplastic tube material 32. A pattern of openings 16 may be made to substantially cover the entire surface of the tube 32. The perforated tube is then flattened out so as to have upper and lower flat panels 34 and 35 respectively, which are preferably heat sealed together as at 36 adjacent the open ends 37 and 38 of the tube. Before heat sealing, the upper and lower flat panels are laterally adjusted so that the openings 16 in flat panel 34 are not in alignment with the openings 16 in flat panel 35. Also, if it is desired, the openings 16 may be made so that they will be present only in the flattened out upper panel 34, such that the lower flattened out panel 35 will have no openings therein. Structure 31 may be used not only as an insert in a bag such as the bag in FIGURE 1, but may be used as an insert in a tray such as the tray of FIGURE 2. FIGURE 4 shows a cross-section of the tray of FIGURE 2 similar to the cross section of this tray as shown in FIGURE 3, with the exception that the structure of FIGURE 6 is shown inserted in the tray with the openings 16 not having been made in the lower flat panel 35 of the tube 32. The arrangement shown in FIGURE 4 is particularly useful when the tray 23 is formed from a material that is not moisture resistant such as uncoated molded cellulosic pulp or from paperboard. The tray is protected by virtue of the fact that the flattened out tube 32 is larger than the bottom panel 25 of the tray 23, such that the marginal edges 33 of the flattened tube 32 project upwardly with and rest against the inside surface of the upwardly turned marginal edges 20 of the tray 23 as illustrated. This upward turning of the marginal edges of the flattened tube 32 prevents any juice from contacting the non-fluid resistant inner surface of the tray 23. Also, since the lower panel 35 of the tube 32 does not have any openings therein, it becomes apparent that any droplets of juice 27 coming into contact with the periphery of an opening 16 in the upper panel 34 will be drawn by capillary action between the panels 34 and 35. Referring to FIGURE 7, it will be better seen how the stored juice 30 is distributed between the panels 34 and 35 in encompassing relationship with the opening 16. It is apparent that since the stored juice 30 does not at any time contact the bottom 25 of the tray, there will be no deterioration of the bottom of the tray by the juice even though the tray be made of non-moisture resistant material.

The arrangement of FIGURE 4 can be made more attractive in appearance by thermo-forming the flattened out perforated and heat sealed tube 32 to closely fit the shape of the tray, and to remove any wrinkles which detract from the appearance of the package. In the event that trouble is encountered by the sticking together of the flat panels 34 and 35 during thermo-forming, this problem can be overcome by coating the interior surface of the tube 32 with a suitable non-adhering dust such as diatomaceous earth, or starch, before sealing and thermo-forming the tube.

The size of the liquid absorbing openings 16 in the various structures illustrated and 16' in structure 11 may vary considerably, but it has been found that openings ranging from $\frac{1}{16}$ to $\frac{1}{8}$ inch in diameter work out very well. The number of liquid absorbing openings in a liquid absorbing structure of a given size may also vary considerably. Obviously the more openings provided, the greater the likelihood of any drop of liquid finding an opening in a minimum time. On the other hand, if the openings occupy over 50% of the area of the perforated sheet, the quantity of liquid that can be concealed will be drastically reduced. It has been further found that very satisfactory results are obtained when the area of all of the openings in a liquid absorbing surface amounts to about 10% of the total surface area.

Further, in accordance with the invention, the openings 16 may be in the form of small slits as shown in FIGURE 8. The slits 16 are shown in a piece of sheet material such as the sheet 24 of FIGURE 2. Slits have the advantage that they even more effectively conceal the stored liquid, and, since the slits are very narrow, more space is provided for storing liquid.

Obviously, from the foregoing description, various modifications of the invention will become apparent to those skilled in the art, and therefore, the scope of the invention is set forth in the appended claims.

I claim:

1. In combination; a container for juice exuding products, such as meat or poultry, said container having a product enclosing wall and being of the type wherein the product is visible to the view of a prospective customer, and, a liquid absorbing and concealing device placed therein so as to rest on an interior surface of the container wall, said liquid absorbing and concealing device comprising two co-extensive expanses of thin substantially moisture resistant material arranged in close, normally touching, superposed relationship to provide a hairline liquid absorbing capillary gap between the expanses with at least one of said expanses being substantially opaque and having a plurality of small liquid passing openings therethrough.

2. Claim 1 in which the container is a plastic bag having a transparent wall and both of said expanses are of thin substantially opaque and moisture resistant material having a plurality of small liquid passing openings therethrough.

3. Claim 2 in which the said expanses of thin substantially opaque and moisture resistant material are attached together along a peripheral edge.

4. A liquid absorbing and concealing tray structure for containing and displaying to prospective customers juice exuding products such as meat or poultry, comprising: a tray having a generally flat bottom wall portion terminating in an upturned peripheral product enclosing edge; a first expanse of thin substantially moisture resistant material resting on and covering the bottom interior of the tray, a second expanse of thin substantially opaque and moisture resistant material in close, normally touching, superposed co-extensive relationship over said first expanse providing a hairline liquid absorbing capillary gap between the expanses, said second expanse having a plurality of small liquid passing openings therethrough over substantially its entire area.

5. Claim 4 in which each of the first and second superposed expanses of thin substantially moisture resistant material has an upturned peripheral edge that substantially covers the upturned peripheral edge of the tray.

6. Claim 5 in which the said expanses of thin substantially moisture resistant material are attached together along their peripheral edges.

7. In combination; a container for juice exuding product such as meat or poultry, said container having a product enclosing wall and being of the type wherein the product is visible to the view of a prospective customer, and, a liquid absorbing and concealing device in said container comprising: a length of tube formed from thin substantially moisture resistant and opaque thermoplastic material; said tube being flattened so as to have flat upper and lower panels in close, normally touching relationship with a hairline liquid obsorbing capillary gap existing between the panels; at least said upper panel containing a plurality of small liquid passing openings therethrough; opposite flattened end portions of said length of tube being heat sealed together; the liquid absorbing and concealing device being placed in said container so that the flattened lower panel thereof rests on the interior surface of the container wall.

8. Claim 7 in which the container is a plastic bag having a transparent wall and the lower panel of the flattened tube also has a plurality of small liquid passing openings therethrough.

9. Claim 7 in which the container is tray having a generally flat bottom wall portion terminating in an upturned peripheral product enclosing edge.

References Cited by the Examiner

UNITED STATES PATENTS

| 2,877,765 | 3/59 | Bunyan. | |
| 3,026,209 | 3/62 | Niblack et al. | 99—174 |
| 3,040,949 | 6/62 | Foote | 229—2.5 |

FRANKLIN T. GARRETT, *Primary Examiner.*

GEORGE O. RALSTON, *Examiner.*